June 5, 1956 N. O. NELSON 2,748,812
SAW-TABLE EXTENSION
Filed July 27, 1954
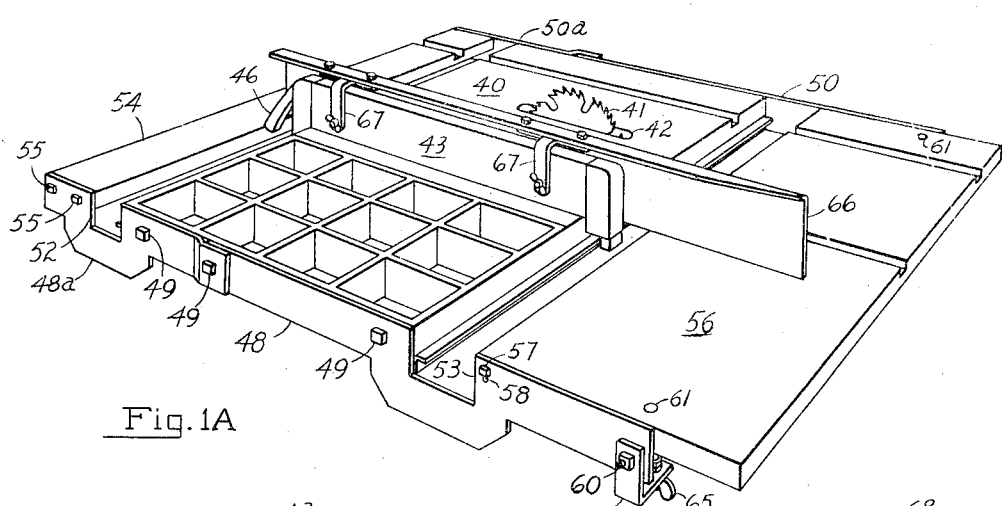
Fig. 1A
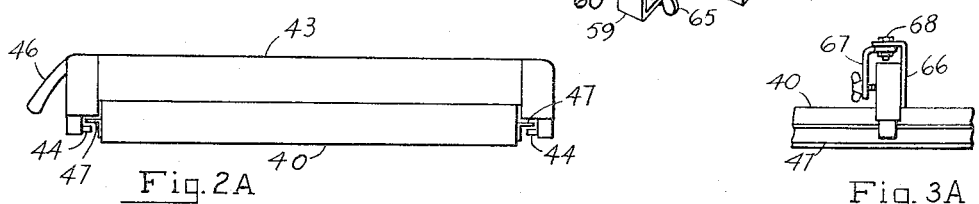
Fig. 2A  Fig. 3A
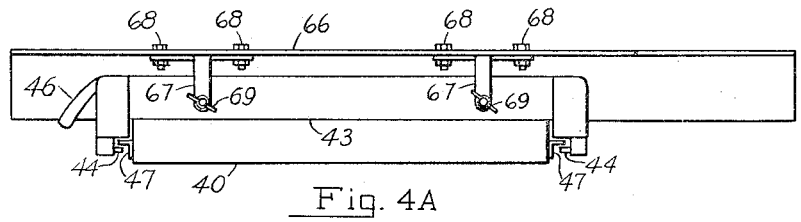
Fig. 4A
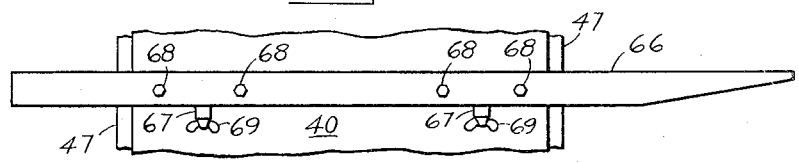
Fig. 5A
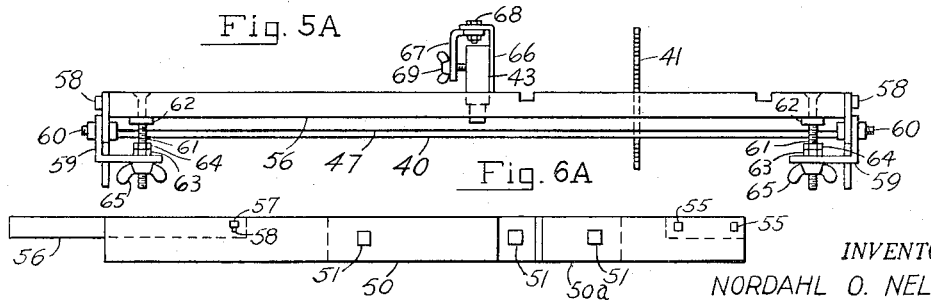
Fig. 6A
Fig. 7A
INVENTOR.
NORDAHL O. NELSON
BY
Arthur O. Andersen
ATTORNEY

United States Patent Office 2,748,812
Patented June 5, 1956

2,748,812

SAW-TABLE EXTENSION

Nordahl O. Nelson, Westby, Wis.

Application July 27, 1954, Serial No. 446,093

4 Claims. (Cl. 143—132)

This invention relates to circular saws and particularly to saws having extended tables and extended fences.

It is an object of this invention to provide a saw table having extensions which can be readily attached to provide extended supporting surfaces for properly guiding work of greater length than that for which the table was intended.

It is another object of the invention to support table extensions from the machine table without interfering with the movement of the fence or the placement of the fence on the table or its removal therefrom.

Another object of the invention is to provide a device which is adapted for use with existing saw tables of various types.

Another object of the invention is to provide means for adjusting a table extension into coplanar relationship with the machine table.

Another object of the invention is to provide means for pivoting a table extension so that it may be raised for access to mechanism under the table.

Other objects and advantages will become apparent as the specification proceeds to describe the invention with reference to the accompanying drawing in which:

Fig. 1A is a perspective view of the extended table with the fence extension in operating position;

Fig. 2A is a view in vertical elevation of the main table alone and the fence without the fence extension;

Fig. 3A is a partial end view of the apparatus of Fig. 1A as viewed from the right of Fig. 1A;

Fig. 4A is a view in vertical elevation of the table with the fence and the fence extension in place;

Fig. 5A is a plan view of the fence and fence extension in position on the main table with portions of the main table broken away;

Fig. 6A is an end view of the main table with the table extensions and the fence extension in place;

Fig. 7A is a side view of the extended table as viewed from the rear of Fig. 1A.

A saw machine table 40 is suitably supported on the usual pedestal which is not shown. A circular saw 41 extends upwardly through a slot 42 in the machine table 40. Saw 41 is rotatably supported on the pedestal not shown. The saw 41 is driven by an electric motor or by some other driver not shown. A fence 43 of well known construction is slidably mounted on machine table 40 and has, at each end, clamping fingers 44 which can be moved by handle 46 into clamping engagement with flanges 47 extending from the front and rear ends of machine table 40.

Bars 48 and 48a are secured by screws 49 to one side of the machine table 40 and bars 50 and 50a are secured by screws 51 to the other side of the table 40. Bars 48, 48a, 50, and 50a may be held to the table 40 by other means than screws as for instance by C-clamps. Bars 48 and 48a have recesses 52 and 53 to permit the fence 43 to pass when it is desired to place the fence on the table or to remove it therefrom.

A front extension table 54 is secured to the bars 48a and 50a by screws 55. A rear extension table 56 is pivotally secured to bars 48 and 50 by screws 57. The screws 57 pass through vertical slots 58 in the bars 48 and 50 so that the front end of the extension table 56 can be adjusted into the plane of the machine table 40. Angles 59 are secured to the bars 48 and 50 by bolts 60. Screws 61 are fixedly secured to the rear extension table 56 by nuts 62. Threaded on each of screws 61 is a nut 63 which bears against angle 59. Locknuts 64 are threaded on screws 61 and are used to lock nuts 63 in adjusted positions. Wing nuts 65 are threaded on the ends of screws 61 and bear against angles 59. It is thus seen that by adjusting nuts 63, 64, and 65, the rear extension table 56 may be pivotally adjusted about the screws 57 to put its working surface in the same plane as the working surface of the main table 40.

When it is desired to inspect or service the equipment under the table 40, the wing nuts 65 can be removed, and the rear extension table 56 can then be pivoted upwardly about screws 57 to an inoperative position which will allow easy access to the equipment under the table 40. If the extension fence is in place, it is first necessary to remove it.

The top edges of the bars 48 and 50 are slightly below the working surfaces of the machine table 40 and the extension tables 54 and 56 so that they do not interfere with the work or the fence 43.

An extension fence 66 has two brackets 67 bolted thereto at 68. Screws 69 are threaded in brackets 67. Screws 69 may be adjusted into engagement with fence 43 to hold the extension fence 66 in working position. It is thus seen that the extension fence 66 can be easily clamped in working position and that it is easily removed from the machine.

It is obvious that minor changes may be made in the form and construction of this invention without departing from the material principles thereof. It is not therefore desired to confine the invention to the exact form herein shown and described, but it is wished to include all such as properly come within the scope of the claims.

What is claimed is:

1. A circular saw machine table, horizontal bars secured to the sides of and extending beyond one end of the machine table, an extension table pivotally secured to said bars, on an axis parallel to said end and extending between said bars, and means adjustably mounted on said extension table and engaging said bars to support said extension table in pivotally adjusted position with respect to said main table.

2. An attachment for a circular saw machine table comprising horizontal bars adapted to be secured to the sides of the machine table to extend beyond the end of the machine table, an extension table pivotally secured to and between said bars, on an axis parallel to said end and being spaced from said machine table and means adjustably mounted on said extension table and engaging said bars to support said extension table in pivotally adjusted position with respect to said machine table.

3. An attachment for a circular saw machine table comprising horizontal bars having transverse vertical slots therein and being adapted to be secured to the sides of the machine table to extend beyond an end of the machine table, an extension table extending between said bars, pivot means secured to said extension table and extending through the slots in said bars to mount said extension table on said bars for pivotal and transverse adjustment with respect to said bars, and means adjustably mounted on said extension table, said last mentioned means being spaced from said pivot means and engaging said bars to support said extension table on said bars in pivotally adjusted position with respect to said machine table.

4. In a circular saw machine, the combination of a machine table, a fence on said machine table, fingers on each end of said fence in clamping engagement with the ends of said machine table, horizontal bars secured to the sides of said machine table and extending beyond one end of the machine table, one of said bars having a recess in its upper edge adjacent said end of the table to provide a passageway for one of said fingers, an extension table secured to and extending between said bars in spaced relation with said one end of said machine table.

References Cited in the file of this patent

UNITED STATES PATENTS

| | | |
|---|---|---|
| 1,474,323 | Geibel | Nov. 13, 1923 |
| 1,938,548 | Tautz | Dec. 5, 1933 |
| 2,075,282 | Hedgpeth | Mar. 30, 1937 |
| 2,273,715 | Lonskey et al. | Feb. 17, 1942 |
| 2,697,458 | Cue | Dec. 21, 1954 |

FOREIGN PATENTS

| | | |
|---|---|---|
| 148,555 | Switzerland | Oct. 1, 1931 |